United States Patent
Rampartab

(10) Patent No.: US 10,376,085 B1
(45) Date of Patent: Aug. 13, 2019

(54) RETRACTABLE ORNAMENT HOOK SYSTEM

(71) Applicant: Shanaaz Rampartab, Brampton (CA)

(72) Inventor: Shanaaz Rampartab, Brampton (CA)

(*) Notice: Subject to any disclaimer, the term of this patent is extended or adjusted under 35 U.S.C. 154(b) by 0 days.

(21) Appl. No.: 15/914,341

(22) Filed: Mar. 7, 2018

(51) Int. Cl.
*A47G 33/08* (2006.01)
*A47G 33/10* (2006.01)
*F16B 45/04* (2006.01)

(52) U.S. Cl.
CPC ............ *A47G 33/10* (2013.01); *F16B 45/04* (2013.01)

(58) Field of Classification Search
CPC ....... F16B 45/00; F16B 45/02; A47G 25/1457
USPC .................................................. 248/303, 304
See application file for complete search history.

(56) References Cited

U.S. PATENT DOCUMENTS

| | | | |
|---|---|---|---|
| 1,747,893 A | | 2/1930 | Fisher |
| 2,719,374 A | * | 10/1955 | Paione ................ A47G 33/10 24/369 |
| 4,452,836 A | * | 6/1984 | Daniel, Jr. ............ A47G 33/10 106/437 |
| 4,909,466 A | | 3/1990 | Matthews |
| 4,923,721 A | * | 5/1990 | Gilmore ............ A47G 33/0809 315/185 S |
| 5,553,905 A | | 9/1996 | Bentivegna |
| 6,155,526 A | | 12/2000 | Brown |
| 9,943,183 B1 | * | 4/2018 | Carter, Jr. ............ A47G 25/32 |

* cited by examiner

*Primary Examiner* — Steven M Marsh
(74) *Attorney, Agent, or Firm* — Integrity Patent Group, PLC; Charles E. Runyan

(57) ABSTRACT

A retractable ornament hook system including a hook assembly having a base having a port, a retractable hook, and a locking mechanism. The retractable hook is configured to retract into and extend from the port located within the base. The retractable hook is able to be locked in a desired extended position relative to the base for use via the locking mechanism. The hook assembly is mountable to an ornament for supporting the ornament on a tree during the extended position.

19 Claims, 5 Drawing Sheets

RETRACTABLE ORNAMENT HOOK SYSTEM

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of supports and more specifically relates to hanging devices.

2. Description of Related Art

Devices such as hooks are used for hanging objects, e.g., ornaments, on Christmas tree branches or other similar supports. Typically, one has to untangle all of the hooks, attach them individually to each ornament and then hang them on the tree. Even this proves to be an issue as the hooks are one standard size, making the ornaments hang crooked and can easily be knocked off. It can be difficult locate the almost invisible hook and reattach it. Unfortunately, 99% of the time one will not find the hook. It has fallen into the tree or onto the floor where a small child or pet could step on or even ingest the sharp hook. Currently there is no other option for hanging ornaments on a tree. There is only the standard sharp metal hook or the flimsy plastic hook that is unreliable, unsafe and takes a very long time to do this very simple task. A suitable solution is desired.

U.S. Pat. No. 6,155,526 to John P. Brown relates to a hanging device for ornaments and other objects. The described hanging device for ornaments and other objects includes a hanging device for hanging an object, e.g., a Christmas tree ornament. The device comprises a locking portion having an end, and a coil spiraling around the end in continuously increasing radii. The device also has an object supporting portion integrally connected to the locking portion opposite the end. As more weight is applied to the device, the coil tends to unwind and tighten around the support member that the device hangs on. Preferably the coil is sized to receive the support member, biasing the support member between successive sections of the coil thereby locking the device on the member. In an exemplary embodiment of the invention, the device is composed of a resilient material, e.g., spring steel wire, to increase the grip of the coil as it unwinds and to help prevent deformation of the device.

BRIEF SUMMARY OF THE INVENTION

In view of the foregoing disadvantages inherent in the known supports art, the present disclosure provides a novel retractable ornament hook system. The general purpose of the present disclosure, which will be described subsequently in greater detail, is to provide a safe and effective solution to hanging Christmas ornaments.

A retractable ornament hook system is disclosed herein. The retractable ornament hook system includes a hook assembly including a base having a port, a retractable hook, and a locking mechanism. The hook assembly comprises the base, the retractable hook, and the locking mechanism in functional combination. The base comprises the port configured to support the retractable hook therein. The retractable hook is configured to retract into and extend from the port. The retractable hook is able to be locked in a desired extended position relative to the base for use via the locking mechanism. The hook assembly is mountable to an ornament for supporting the ornament on a tree during the extended position.

A method of using the retractable ornament hook system is also disclosed herein including the steps of providing a hook assembly including a base having a port, a retractable hook, and a locking mechanism; applying the hook assembly to an ornament; pushing and twisting the base to extend the retractable hook; locking the retractable hook in a desired extended position; hanging the ornament on a tree; retracting the retractable hook; and removing the hook assembly from the ornament.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a retractable ornament hook system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to supports and more particularly to a retractable ornament hook system as used to improve the efficiency of hanging ornaments on a Christmas tree or the like.

Generally, the invention simplifies the process of hanging Christmas ornaments and provides a safe alternative to traditional hooks. Each ornament may have its own hook assembly. It will attach snugly on to any tree branch, effectively ensuring that the ornament will not (easily) fall off. Then, when it is time to take the ornaments off the tree, a retractable hook of the hook assembly retracts and can be store safely until next time. The retractable hook provides a safe alternative to traditional hooks with a rounded hook tip. The hook assembly may be easily added to current ornament designs. The retractable hook is preferably controlled by a push, twist and locking action. The hook may be spring loaded. The user pushes it down and it clicks in a retracted position. Then the user pushes a button and the retractable hook jumps into an extended position. The retractable hook system may be provided by itself such that it can be glued or attached to any ornament.

The retractable hook may have the ability to be extended to two different heights in order to increase the hanging options for consumers. The first extended height allows an ornament to hang closely to a tree limb, effectively ensuring that it hangs straight and secure. This option is great for both large and small ornaments. The second extended height allows the ornament to hang a little lower from (in relation to) the tree limb, giving the ability to fill in decorating gaps or allow space for non-spherical ornaments. This option is great for both large, small and oddly shaped ornaments. The retractable hook may comprise stainless steel or other suitable material in which the retractable hook can maintain its shape for years of use, be rust proof for storage and live tree applications and have a rounded tip for safety. Other materials may be used as well as different extending/retracting/locking/unlocking means.

Figure 1:
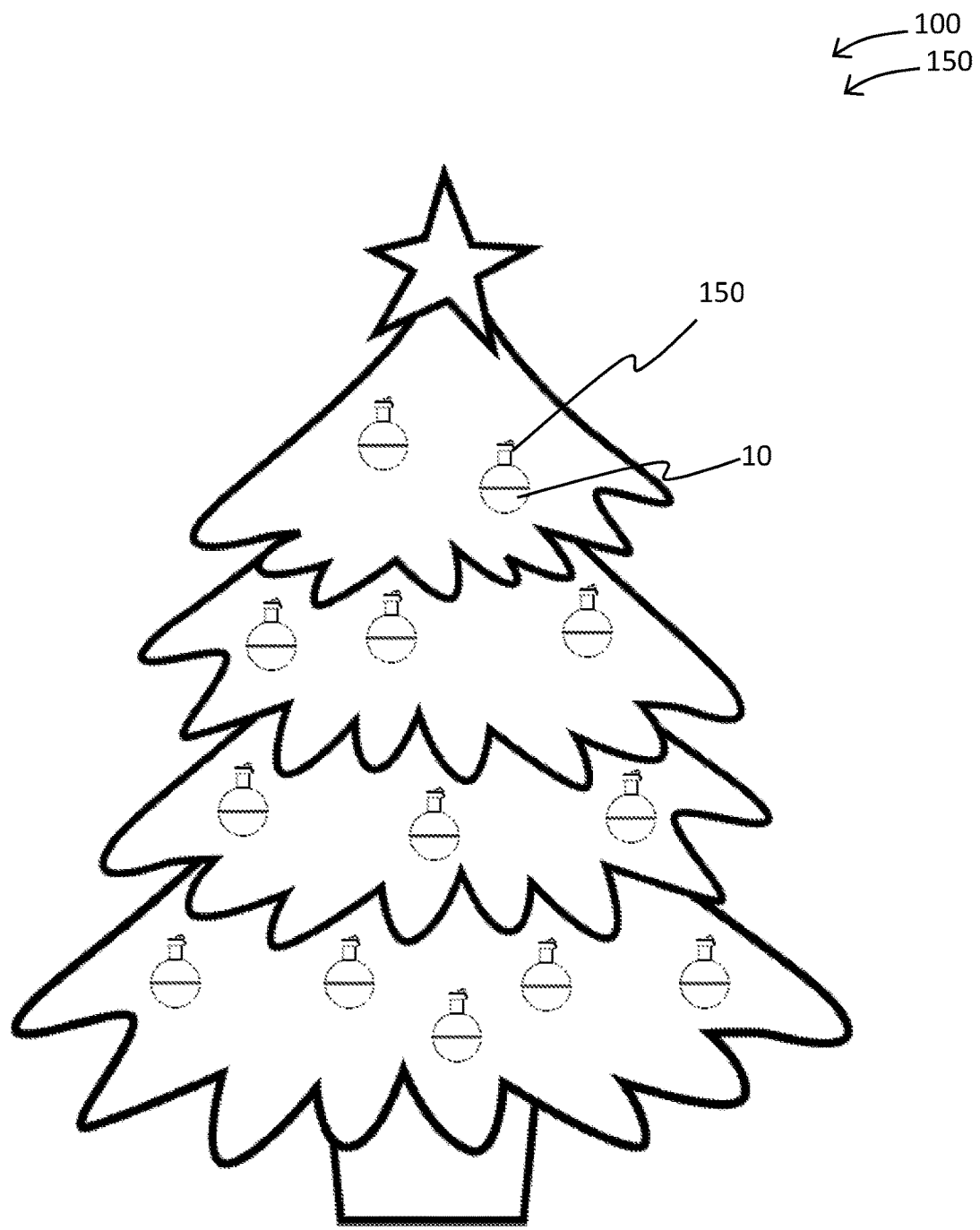
FIG. 1 is a perspective view of the retractable ornament hook system during an 'in-use' condition, according to an embodiment of the disclosure.

Referring now more specifically to the drawings by numerals of reference, there is shown in FIGS. 1-4, various views of a retractable ornament hook system 100. FIG. 1 shows a retractable ornament hook system 100 during an 'in-use' condition 150, according to an embodiment of the present disclosure. As illustrated, the retractable ornament hook system 100 may include a hook assembly 110 including a base 120 having a port 124, a retractable hook 130, and a locking mechanism 134. The hook assembly 110 comprises the base 120, the retractable hook 130, and the locking mechanism 134 in functional combination. The base 120 comprises the port 124 configured to support the retractable hook 130 therein. The retractable hook 130 is configured to retract into and extend from the port 124. The retractable hook 130 is able to be locked in a desired extended position relative to the base 120 for use via the locking mechanism 134. The hook assembly 110 is mountable to an ornament 10 such as a Christmas-tree-ornament, either spherical or other shape, for supporting the ornament 10 on a tree during the extended position.

Figure 2:
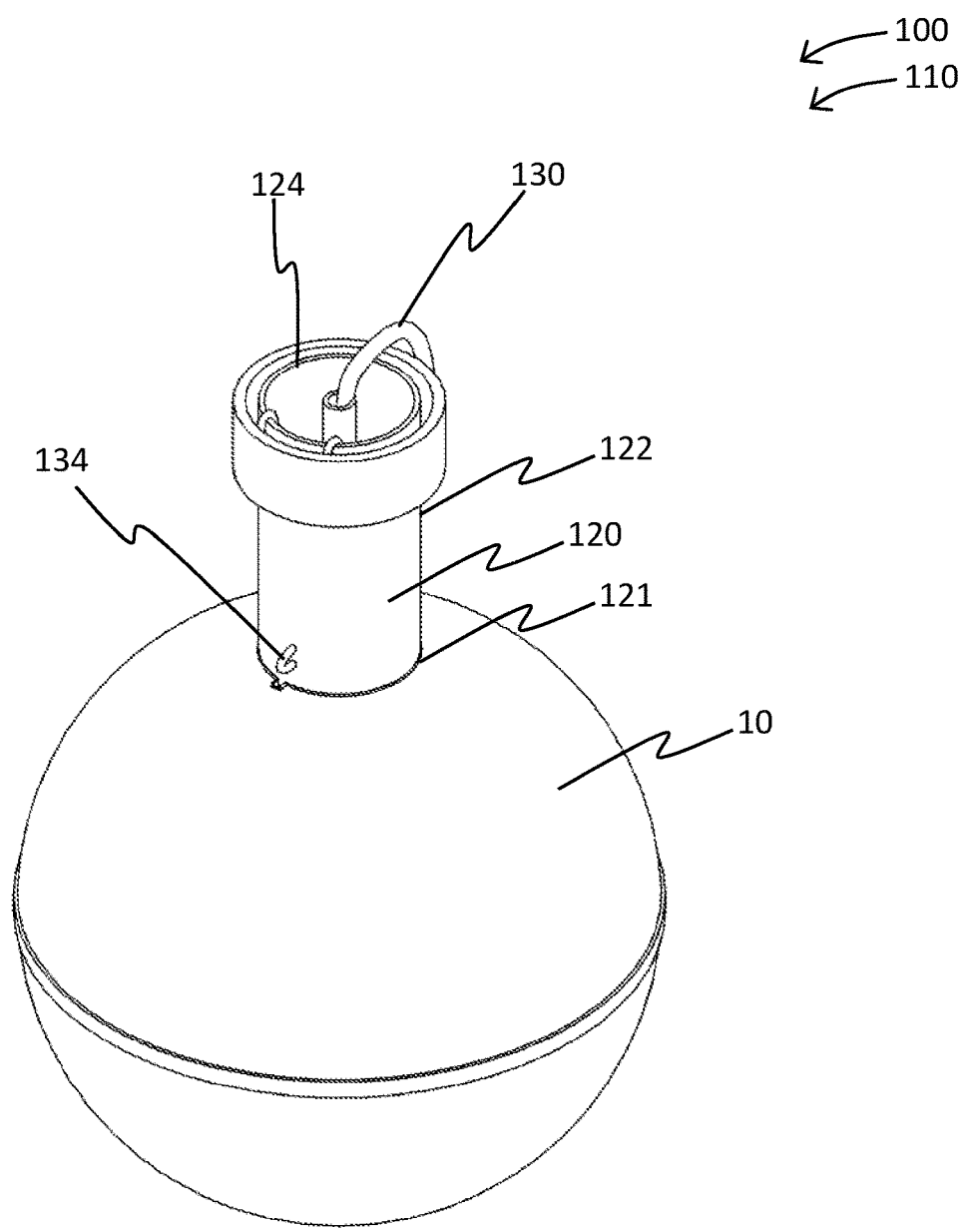
FIG. 2 is a perspective view of the retractable ornament hook system of FIG. 1, according to an embodiment of the present disclosure.

FIG. 2 shows a perspective view of the retractable ornament hook system 100 of FIG. 1, according to an embodiment of the present disclosure. As above, the retractable ornament hook system 100 may include the hook assembly 110 including the base 120 having the port 124, the retractable hook 130, and the locking mechanism 134. The base 120 comprises a generally three-dimensional cylindrical profile having a first-end 121 and a second-end 122. The first-end 121 receives a top-end of the ornament 10. The retractable hook 130 extends from the port 124 positioned at the second-end 122. The retractable hook 130 is configured to extend when a user pushes down on the base 120 and twists the base 120. The retractable hook 130 is concealed within the base 120 during a retracted position.

Figures 3A, 3B:
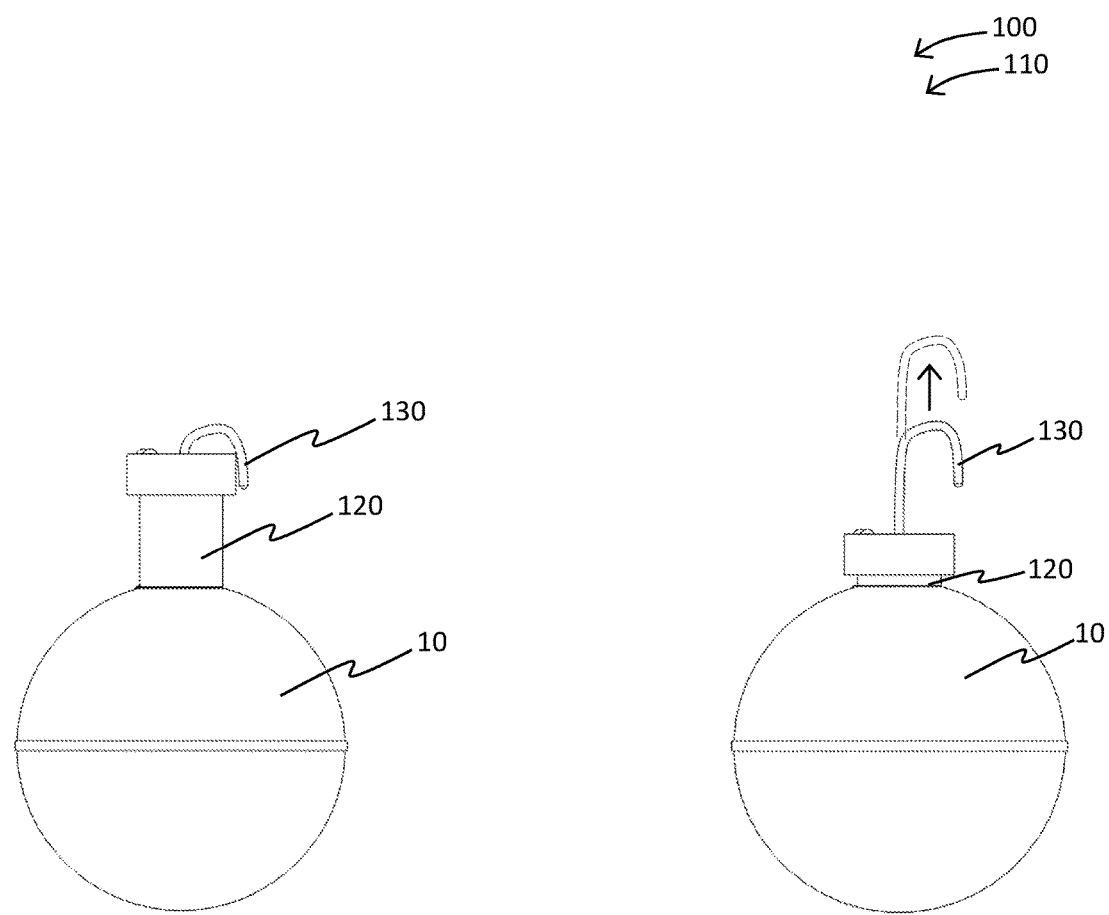
FIG. 3A is a perspective view of the retractable ornament hook system of FIG. 1, in a retracted condition according to an embodiment of the present disclosure.
FIG. 3B is a perspective view of the retractable ornament hook system of FIG. 1, in an extended condition displaying a first-extended-height and a second-extended-height according to an embodiment of the present disclosure.

Referring now to FIGS. 3A and 3B showing views of the retractable ornament hook system 100 of FIG. 1, according to an embodiment of the present disclosure. As above, the retractable ornament hook system 100 may include the hook assembly 110 including the base 120 having the port 124, the retractable hook 130, and the locking mechanism 134. The hook assembly 110 is removeably coupled to the ornament 10. The hook assembly 110 may come with the ornament 10 or may be user applied to existing ornaments 10. The retractable hook 130 is semi-rigid to support a mass of the ornament 10. The retractable hook 130 includes a curved end configured to mount the hook assembly 110 on the tree. The retractable hook 130 comprises a rounded tip for additional safety. The desired extended position comprises a first-extended-height and a second-extended-height. The second-extended-height is greater than the first-extended-height allowing a user to hang ornaments 10 at a desired distance from a tree branch or fill gap areas. The hook assembly 110 is reusable.

Figure 4:
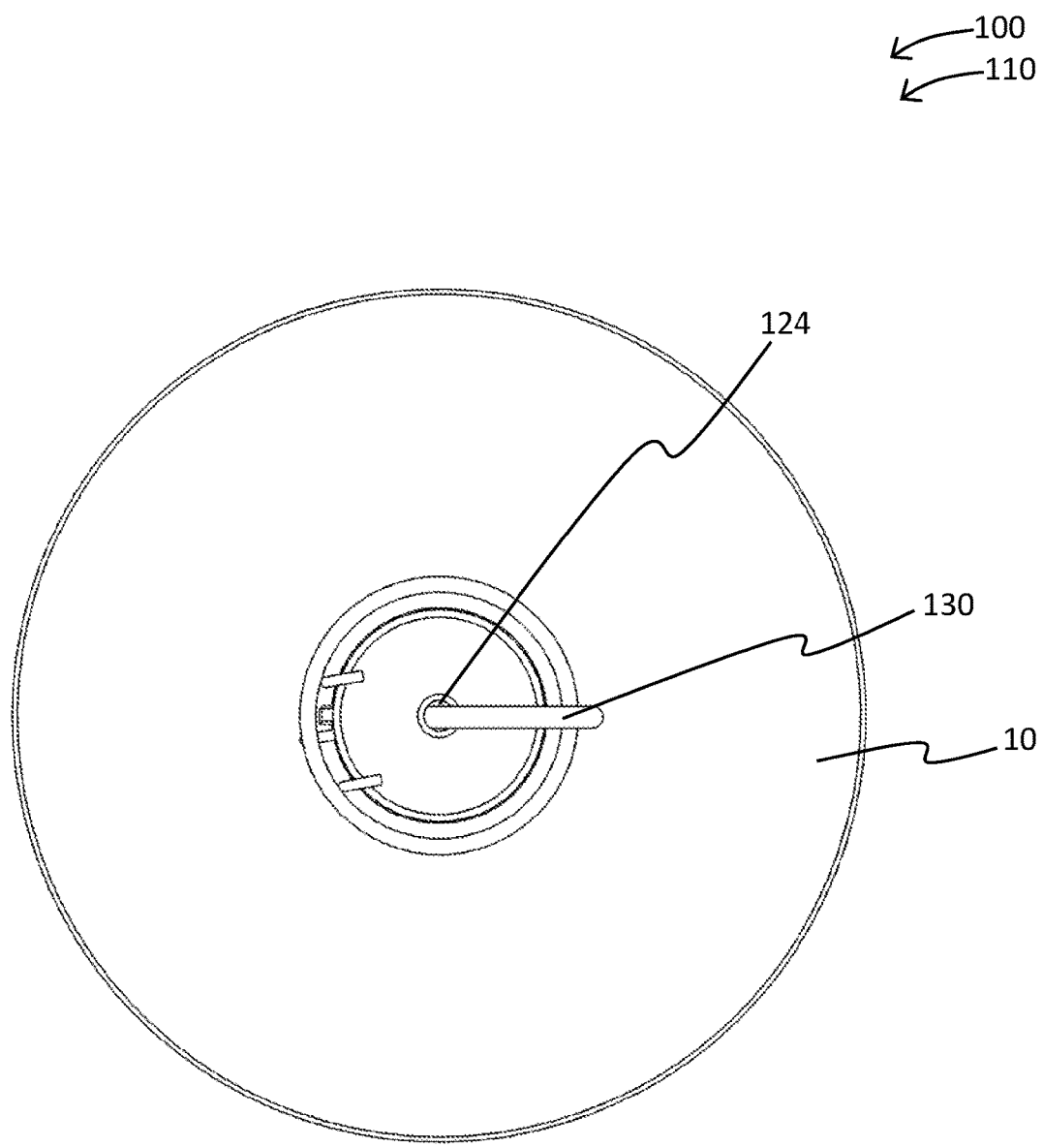
FIG. 4 is a perspective view of the retractable ornament hook system of FIG. 1, according to an embodiment of the present disclosure.

According to one embodiment, the retractable ornament hook system 100 may be arranged as a kit 105. FIG. 4 shows the kit of the retractable ornament hook system 100. In particular, the retractable ornament hook system 100 may further include a set of instructions 107 and at least one hook assembly 110. The instructions 107 may detail functional relationships in relation to the structure of the retractable ornament hook system 100 such that the retractable ornament hook system 100 can be used, maintained, or the like, in a preferred manner with OEM ornaments or existing ornaments being retro-fitted to.

Figure 5:
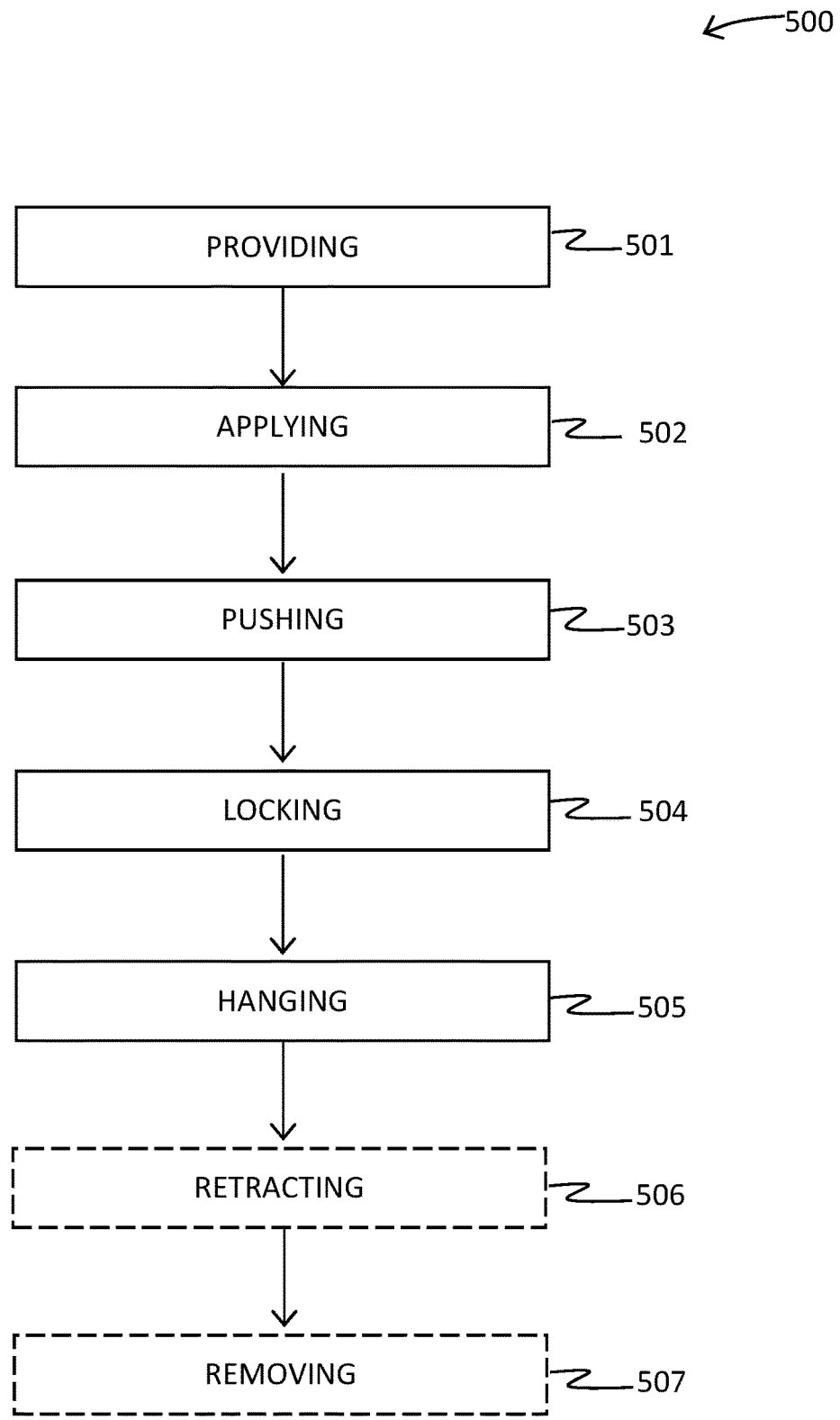
FIG. 5 is a flow diagram illustrating a method of use for the retractable ornament hook system, according to an embodiment of the present disclosure.

Referring now to FIG. 5, a flow diagram illustrating a method for using 500 a retractable ornament hook system 100, according to an embodiment of the present disclosure. In particular, the method for using 500 a retractable ornament hook system 100 may include one or more components or features of the retractable ornament hook system 100 as described above. As illustrated, the method for using 500 a retractable ornament hook system 100 may include the steps of: step one 501, providing a hook assembly 110 including a base 120 having a port 124, a retractable hook 130, and a locking mechanism 134; applying the hook assembly 110 to an ornament 10; step two 502, pushing and twisting the base 120 to extend the retractable hook 130; step three 503, locking the retractable hook 130 in a desired extended position; step four 504, hanging the ornament 10 on a tree; step five 505, retracting the retractable hook 130; and step six 506, removing the hook assembly 110 from the ornament 10.

It should be noted that step five 505 and step six 506 are optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using a retractable ornament hook system, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A retractable ornament hook system comprising:
   a hook assembly including;
      a base having;
         a port;
         a retractable hook; and
         a locking mechanism;
      wherein said hook assembly comprises said base, said retractable hook, and said locking mechanism in functional combination;
      wherein said base comprises said port configured to support said retractable hook therein;
      wherein said retractable hook is configured to retract into and extend from said port;
      wherein said retractable hook is able to be locked in a desired extended position relative to said base for use via said locking mechanism;
      wherein said hook assembly is mountable to an ornament for supporting said ornament on a tree during said extended position;
      and
      wherein said base comprises a generally three-dimensional cylindrical profile.

2. The retractable ornament hook system of claim 1, wherein said base comprises a first-end and a second-end, said first-end receives a top-end of said ornament.

3. The retractable ornament hook system of claim 2, wherein said retractable hook extends from said port, said port being positioned at said second-end.

4. The retractable ornament hook system of claim 3, wherein said retractable hook is configured to extend when a user pushes down on said base and twists said base.

5. The retractable ornament hook system of claim 1, wherein said retractable hook is concealed within said base during a retracted position.

6. The retractable ornament hook system of claim 1, wherein said ornament is a Christmas-tree-ornament.

7. The retractable ornament hook system of claim 1, wherein said retractable hook is semi-rigid.

8. The retractable ornament hook system of claim 7, wherein said retractable hook supports a mass of said ornament.

9. The retractable ornament hook system of claim 1, wherein said hook assembly is removeably coupled to said ornament.

10. The retractable ornament hook system of claim 1, wherein said retractable hook includes a curved end configured to mount said hook assembly on said tree.

11. The retractable ornament hook system of claim 10, wherein said retractable hook comprises a rounded tip.

12. The retractable ornament hook system of claim 1, wherein said desired extended position comprises a first-extended-height.

13. The retractable ornament hook system of claim 12, wherein said desired extended position comprises a second-extended-height.

14. The retractable ornament hook system of claim 13, wherein said second-extended-height is greater than said first-extended-height.

15. The retractable ornament hook system of claim 1, wherein said hook assembly is reusable.

16. A retractable ornament hook system, the retractable ornament hook system comprising:
   a hook assembly including;
      a base having;
         a port;
         a retractable hook; and
         a locking mechanism;
      wherein said hook assembly comprises said base, said retractable hook, and said locking mechanism in functional combination;
      wherein said base comprises a generally three-dimensional cylindrical profile;
      wherein said base comprises said port configured to support said retractable hook therein;
      wherein said retractable hook is configured to retract into and extend from said port;
      wherein said base comprises a first-end and a second-end, said first-end receives a top-end of said ornament;
      wherein said retractable hook extends from said port, said port being positioned at said second-end;
      wherein said retractable hook is configured to extend when a user pushes down on said base and twists said base;
      wherein said retractable hook is able to be locked in a desired extended position relative to said base for use via said locking mechanism;
      wherein said hook assembly is mountable to an ornament for supporting said ornament on a tree during said extended position;
      wherein said retractable hook is concealed within said base during a retracted position;
      wherein said ornament is a Christmas-tree-ornament;
      wherein said retractable hook is semi-rigid;
      wherein said retractable hook supports a mass of said ornament;
      wherein said hook assembly is removeably coupled to said ornament;
      wherein said retractable hook includes a curved end configured to mount said hook assembly on said tree;
      wherein said retractable hook comprises a rounded tip;
      wherein said desired extended position comprises a first-extended-height;
      wherein said desired extended position comprises a second-extended-height;
      wherein said second-extended-height is greater than said first-extended-height; and
      wherein said hook assembly is reusable.

17. The retractable ornament hook system of claim 16, further comprising a set of instructions; at least one hook assembly; and wherein the retractable ornament hook system is arranged as a kit.

18. A method of using a retractable ornament hook system, the method comprising the steps of:
   providing the hook system of claim 1;
   applying said hook assembly to an ornament;
   pushing and twisting said base to extend said retractable hook;
   locking said retractable hook in a desired extended position; and
   hanging said ornament on a tree.

19. The method of claim 18, further comprising the steps of:

retracting said retractable hook;
and
removing said hook assembly from said ornament.

\* \* \* \* \*